United States Patent [19]

Yax et al.

[11] 4,100,336
[45] Jul. 11, 1978

[54] METHOD FOR THE CONTINUOUS MANUFACTURE OF HYDROCARBON RESINS

[75] Inventors: Emile Yax, Forbach; Aurélien Abad, Sarreguemines, both of France

[73] Assignee: Societe Chimique des Charbonnages, Courbevoie, France

[21] Appl. No.: 778,300

[22] Filed: Mar. 16, 1977

[30] Foreign Application Priority Data

Mar. 16, 1976 [FR] France .................. 76 07564

[51] Int. Cl.² .................. C08F 4/14; C08F 32/06; C08F 32/08; C08F 12/06
[52] U.S. Cl. .................. 526/67; 526/86; 526/87; 526/237; 526/282; 526/283; 526/290; 526/308
[58] Field of Search .................. 526/67, 86, 87, 237, 526/282, 283, 308, 290

[56] References Cited

U.S. PATENT DOCUMENTS

| | | | |
|---|---|---|---|
| 2,340,413 | 2/1944 | Cline et al. | 260/81 |
| 2,677,002 | 4/1954 | Yahnke et al. | 260/683.15 |
| 2,697,694 | 12/1954 | Shalit et al. | 526/237 |
| 2,708,639 | 5/1955 | Miller | 106/285 |
| 2,770,613 | 11/1956 | Tegge et al. | 526/283 |
| 3,478,005 | 11/1969 | Wheeler | 526/308 |
| 3,778,421 | 12/1973 | Hayashi et al. | 260/82 |
| 3,846,352 | 11/1974 | Bullard et al. | 526/283 |

FOREIGN PATENT DOCUMENTS

| | | | |
|---|---|---|---|
| 1,147,019 | 4/1969 | United Kingdom | 526/67 |
| 1,379,150 | 1/1975 | United Kingdom. | |
| 1,418,604 | 12/1975 | United Kingdom. | |

OTHER PUBLICATIONS

Hydrocarbon Processing and Petroleum Refiner, Jul. 1964, vol. 42, No. 7, "How to Make Polybutadiene Resins," pp. 165–168.

*Primary Examiner*—Alan Holler
*Attorney, Agent, or Firm*—Karl W. Flocks

[57] ABSTRACT

A method for the continuous manufacture of hydrocarbon resins starting from polymerizable insaturated hydrocarbons adapted to selectively obtain clear resins having well determined viscosities or softening points and to control the temperature of the polymerization reaction conducted in the presence of a Lewis acid as catalyst and recycling a fraction of the reaction mixture, due to the improvement comprising the steps of forming a close mixture of the catalyst and of the hydrocarbon fraction to be polymerized in a reactor, said mixture containing, by weight, from 0.05 to 0.8 part, and preferably from 0.1 to 0.4 part, of catalyst for 100 parts of hydrocarbons, diluting and dispersing said mixture homogeneously by means of, and/in, a portion of stream of the medium issuing from the reactor in the proportion of from 60 to 300 parts, by volume, of said stream, and preferably of from 80 to 140 parts, for one part, by volume, of the hydrocarbon fraction to be polymerized, said polymerization being, in addition, contingently carried out in the presence of water added in the proportion of from 0 to 2.2 moles per mole of catalyst, and drawing off the remaining portion of the medium issuing from the reactor so as to isolate the resin obtained therefrom, the temperature of the reaction medium being maintained constant through heat-exchange, between 30° and 120° C, and preferably between 40° and 110° C, for a dwell time of from 10 to 60 minutes, and preferably of from 20 to 40 minutes, in the reactor.

9 Claims, 1 Drawing Figure

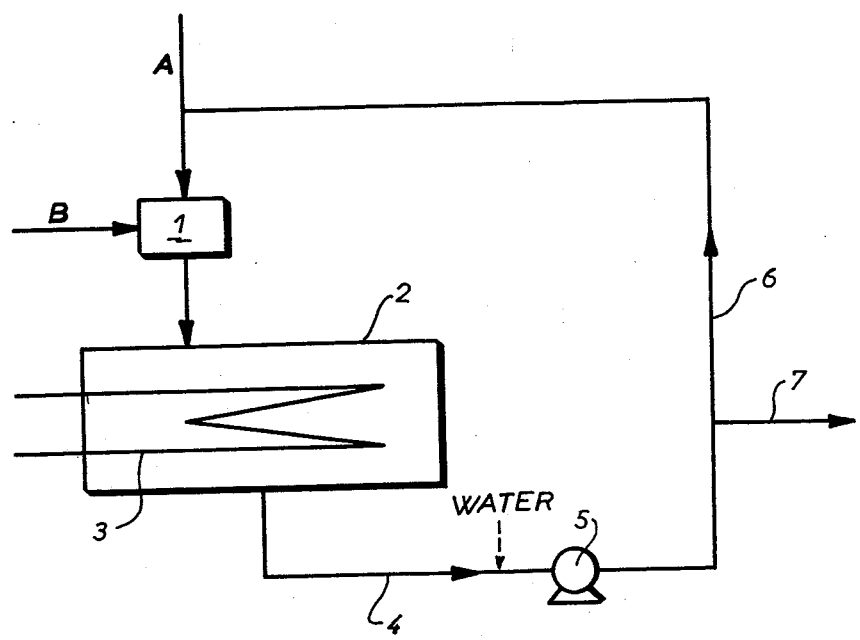

METHOD FOR THE CONTINUOUS MANUFACTURE OF HYDROCARBON RESINS

The present invention relates to an improved method for the continuous manufacture of resins resulting from the polymerization of hydrocarbons comprising mainly aromatic hydrocarbons with at least one unsaturated acyclic lateral chain, or an unsaturated cyclic chain, or else polyunsaturated cyclic hydrocarbons.

As is well known, it is possible, with cationic initiators, to polymerize hydrocarbons with unsaturated chains, either alone or in admixture, by submitting them to a Lewis acid as a catalyst. Among said Lewis acids boron trifluoride ($BF_3$) or one of the etherates thereof, and aluminum trichloride ($AlCl_3$) or tin tetrachloride ($SnCl_4$) have been used.

Such a polymerization can be carried out at various temperatures and it is also known that the softening point of a resin obtained from a hydrocarbon fraction depends upon the polymerization temperature and the catalyst concentration, but, as a rule, the higher the polymerization temperature, the lower the softening point (see, Encyclopaedia of Polymer Science and Technology, John Wiley & Sons, publishers (1968), vol. 9, page 856).

Such polymerization steps can be operated by adding the catalyst to the hydrocarbon mixture to be polymerized, or else, as disclosed in particular in British Pat. No. 1,355,473, the mixture to be polymerized can be added to the catalyst, contingently in the dilute state.

Since the polymerization reaction involved is, in most cases, highly exothermic, it is often difficult to control the temperature, so that, in the case of methods carried out by batches, the resulting products may, among various batches, exhibit variations in their properties, such variations being at times highly significant, which, from an industrial or commercial standpoint, is a non-negligible drawback in view of the uncertainty that may happen to face manufacturers as regards both the constancy and reproducibility of the properties of his products.

Even these continuous methods for the manufacture of hydrocarbon resins as above described do not prove fully satisfactory, since, in particular, they do not provide resins the softening points of which are distributed over a wide range.

The present invention provides a method for the continuous manufacture of hydrocarbon resins obviating the above drawbacks, said method permitting one to selectively obtain resins having accurately defined viscosities or softening points in a wide range of viscosities and softening points, on the one hand, and to control the reaction temperature, on the other hand.

The method according to the invention is essentially characterized in that is comprises the steps of forming a close mixture of the catalyst and of the hydrocarbon fraction to be polymerized with a view to polymerizing said mixture in a reactor, said mixture containing, by weight, from 0.05 to 0.8 part, and preferably from 0.1 to 0.4 part, of catalyst for 100 parts of hydrocarbons, diluting and dispersing said mixture homogeneously by means of, and/in, a portion of stream of the medium issuing from the reactor in the proportion of from 20 to 300 parts, by volume, of said stream, and preferably of from 80 to 140 parts, for one part, by volume, of the hydrocarbon fraction to be polymerized, and drawing off the remaining portion of the medium issuing from the reactor so as to isolate the resin obtained therefrom, the temperature of the reaction medium being maintained constant through heat-exchange, between 20° and 120° C, and preferably between 30° and 110° C, for a dwell time of from 10 to 60 minutes, and preferably of from 20 to 40 minutes, in the reactor.

According to an advantageous embodiment, the catalyst is injected, diluted and dispersed in a reactor feeding stream comprising the required amount of the hydrocarbon fraction to be polymerized to which has been added the corresponding amount of the diluting and dispersing stream issuing from the reactor (the latter stream will be termed 'recycling stream' in the following description).

In the method according to the invention, any catalyst of the type normally used for polymerizing polymerizable hydrocarbon fractions can be used. It is, however, preferred to use boron trifluoride, through which are obtained resins that are less deeply coloured than those obtained by means of other catalysts, such as aluminum chloride. It is possible to use said boron trifluoride as available on the market, either in the liquid state (such as the $BF_3$ — ethyl ether complex), or in the gaseous state.

Whatever the catalyst may be, the step of injecting said catalyst into the fraction of the hydrocarbon feed to be polymerized added with the recycling stream, shall be carried out preferably by means of any suitable device, known per se, permitting to achieve a fine, homogeneous dispersion of a fluid in another fluid. No such device is described here since it is well known to the man skilled in the art.

To provide satisfactory results, the recycling ratio, such as determined above, viz. amount of recycled stream to the amount of fresh hydrocarbon feed, is not allowed to vary in a wide range of values, since, should said ratio be too small, the reaction could not be easily controlled, whereas, should it be too large, the resins as obtained would have (all conditions being the same in other respects) lower softening points and it would be difficult to reach high softening points.

As regards the dwell time, it is to be noted that a shorter dwell time will provide a greater amount of resin. On the other hand, the softening point of the thus-obtained resin will be higher and, in order to bring it down to a lower value, it would be necessary to raise the temperature as well as the catalyst ratio.

Any mixture of polymerizable unsaturated hydrocarbons, including predominantly aromatic mixtures, can be treated according to the present invention. The concentration of polymerizable hydrocarbons with respect to the whole mixture to be reacted can be caused to vary in a wide range, provided however that the concentration of non-polymerizable hydrocarbons is high enough for acting as a solvent for the resin obtained. Therefore, a polymerizable hydrocarbon concentration of from 20 to 70% (and, preferably, of from 30 to 55%) shall be adopted.

The mixture of hydrocarbons to be polymerized can be achieved starting from pure products. Such polymerizable hydrocarbons (either alone or admixed) shall be selected from the group comprising styrene, methylstyrenes, vinyl-toluenes, indene, methyl-indenes, dicyclopentadiene and methyl-dicyclopentadienes.

The mixture of hydrocarbons can also be obtained through the distillation of a fraction of heavy naphtha resulting from the pyrolysis of a petroleum batch, e.g. a batch of naphta.

Such distillation can be carried out by means of one or several columns. In any case, the fraction of heavy naphtha, prior to being distilled, no longer contains light hydrocarbons with boiling points less than about 60° C.

The mixture of hydrocarbons to be polymerized can also be constituted by a fraction of carbo-chemical origin containing mainly indene and coumarone. In such a case, it will be suitable to carry out a previous dilution, in a non-polymerizable aromatic hydrocarbon, of the batch to be treated, so as to avoid any trouble arising from too high a concentration of the resin in the solution issuing from the reactor.

The method according to the invention thus leads to the continuous drawing-off of a portion of the reaction mixture comprising the resin formed, the non-polymerizable hydrocarbons serving as solvents, a very small amount of non-polymerized unsaturated hydrocarbons, and the catalyst in an essentially complexed form.

The treatment of the thus drawn off reaction mixture for isolating the desired resin therefrom, can be carried out in any manner known per se. Thus, for instance, it will prove convenient to proceed with a treatment comprising the following steps:

Neutralizing the mixture as obtained, by means of a diluted solution of a strong base;
Decanting;
Water washing the new liquid organic phase obtained;
Decanting;
Filtering;
Decanting;
Evaporating the solvent-phase (non-polymerizable and non-polymerized hydrocarbons).

The strong base required for neutralizing the catalyst contained in the phase to be treated shall be caustic soda, preferably, and used in aqueous solution, at a concentration, by weight, of from 2 to 25%, preferably.

The water-washing step shall be conducted at a temperature of from 50° to 90° C, preferably, the rate of flow of water being preferably of from 0.2 to 0.5 times that of the organic solution.

The step of contracting resin through distillation of the solvent shall be conducted according to any method ensuring a continuous operation and, in particular, with the help of a thin-layer evaporator.

The method according to the invention can also be conducted by contingently introducing into the reactor a very small amount of water which can be of up to 2.2 moles per mole of $BF_3$ introduced into said reactor. The water thus added permits, without impairing reactivity (since the resin outputs are maintained), with the same starting batches to obtain resins the viscosity of which is considerably reduced in the case of starting from styrene-rich fractions, or resins with lower softening points, in the case of starting from petroleum fractions leading to solid resins.

Such a small amount of water can be fed at any point of the reactor feed-path.

The scope and advantages of the present invention will appear more clearly from the following data and results, provided merely as examples, the method being carried out as diagrammatically indicated by the attached figure, in which:

arrow A designates the input of fresh hydrocarbon batch,
arrow B designates the input of catalyst,
numeral 1 indicates the device for carrying out a close mixture and the dispersion of the streams introduced into the reactor designated by numeral 2,
numeral 3 is a heat-exchanger,
numeral 4 is a duct for drawing off the reaction-medium driven by pump 5, and
numerals 6 and 7 are conducts for the recycling flow and for the flow of drawn off product, respectively.

I. Batches of Polymerizable Hydrocarbons

Batch A

This batch is constituted by the core-fraction, the boiling point of which is between 110° and 205° C, of the distillation of a heavy naphtha distilling between 60° and 220° C, and resulting from steam-cracking of naphtha.

The composition of said batch is given in table I, first column.

Batch B

Starting from the same heavy naphtha as the one used for batch A, but applying different operating conditions in the distillation tower, one obtains a distillation core-fraction with a boiling point between 135° and 205° C, the composition of which is given in table I (second column).

Batch C

The distillation residue of a heavy naphtha provided by pyrolysis of naphtha, the distillation range of which is from 150° to 265° C, is submitted to a second distillation step and leads to a mixture of hydrocarbons with a boiling-point between 150° and 205° C, the composition of which is given at table I (third column).

Batch D

It is constituted by mixing one part of a carbo-chemical load, the distilling range of which extends from 135° to 195° C and the composition of which is given at table I (fourth column), with one part of technical xylene.

Batch E

Starting from the same heavy naphtha as the one used for batch A, but applying different operating conditions in the distillation tower, one obtains a distillation core-fraction with a boiling-point between 130° and 165° C, the composition of which is as follows:

| | | |
|---|---|---|
| Benzene 0.54 | n-propylbenzene 0.77 | beta-methylstyrene 0.18 |
| Toluene 3.37 | Ethyltoluenes 3.77 | Vinyltoluenes 1.56 |
| Ethylbenzene 5.15 | Allylbenzene 1.10 | Indene 0.18 |
| Xylenes 44.58 | Mesitylene 0.98 | Other hydrocarbons 1.15 |
| Cumene 0.12 | Pseudocumene 0.99 | |
| Styrene 35.02 | alpha-methylstyrene 0.50 | (in % by weight) |

Batch F

A mixture of 50% by weight, of styrene and 50% of xylene.

Batch G

A mixture of 20% by weight, of styrene and 80% of xylene.

TABLE I

| | Composition in % by weight | | | |
|---|---|---|---|---|
| | Batches | | | D (prior to dilution) |
| Components | A | B | C | |
| Ethylene | 4.1 | 0.6 | 0 | 0 |
| Xylenes | 28.4 | 11.7 | 0 | 0 |
| Styrene | 19.3 | 3.5 | 0 | 2.1 |
| Ethyltoluenes | 4.4 | 4.0 | 6.1 | 3.1 |
| α-methyl Styrene | 2.5 | 1.8 | 1.5 | 1.1 |
| Vinyltoluenes | 13.3 | 18.6 | 21.2 | 4.3 |

TABLE I-continued

| | Composition in % by weight | | | |
|---|---|---|---|---|
| | Batches | | | D (prior to dilution) |
| Components | A | B | C | |
| Pseudo cumene | 2.9 | 4.3 | 8.3 | 5.4 |
| Dicyclopentadiene | 0.1 | 0.1 | 9.1 | 0 |
| Indane | 0.2 | 0.5 | 0.9 | 16.5 |
| Coumarone | 0 | 0 | 0 | 6.5 |
| Indene | 6.4 | 14.7 | 11.3 | 43.5 |
| Methyldicyclopentadiene | 1.2 | 0.9 | 5.1 | 0 |
| Methylcoumarones | 0 | 0 | 0 | 4.1 |
| Methylindenes | 2.3 | 8.7 | 7.3 | 0 |
| Naphthalene | 2.3 | 3.2 | 4.0 | 0.5 |
| Total amount of other hydrocarbons | 12.6 | 27.5 | 24.8 | 12.9 |

II. Polymerization of the Unsaturated Hydrocarbons

TABLE II

| | Batch A | | | Batch B | | Batch C | | Batch D (50% dilution in xylene) | |
|---|---|---|---|---|---|---|---|---|---|
| | Low KS | Medium KS | High KS | Low KS | High KS | Low KS | High KS | Low KS | High KS |
| Polymerization | | | | | | | | | |
| T (° C) | 45 | 30 | 30 | 55 | 30 | 55 | 30 | 110 | 40 |
| Catalyst rate | 0.3 | 0.17 | 0.11 | 0.35 | 0.08 | 0.35 | 0.11 | 0.15 | 0.3 |
| Recycling rate | 110 | 140 | 120 | 80 | 100 | 90 | 110 | 120 | 110 |
| Average dwell time (in minutes) | 30 | 30 | 30 | 30 | 30 | 30 | 30 | 30 | 30 |
| Concentration of resin | 54 | 47 | 38 | 57 | 39 | 52 | 44 | 58 | 66 |
| KS (° C) | 68 | 90 | 119 | 85 | 139 | 89 | 133 | 69 | 149 |
| Gardner-colour | 7 | 5.5 | 4.5 | 7 | 5 | 10 | 6.5 | 13.5 | 5 |
| Neutralization | | | | | | | | | |
| Concentration of soda | 4% | 4% | 4% | 4% | 4% | 4% | 4% | 20% | 20% |
| Rate of flow (soda/batch rate, by volume) | 0.4 | 0.4 | 0.4 | 0.4 | 0.4 | 0.4 | 0.4 | 0.4 | 0.4 |
| T (° C) | 80 | 80 | 80 | 80 | 80 | 80 | 80 | 80 | 80 |
| Washing-step | | | | | | | | | |
| Rate of flow (water/batch, by volume) | 0.4 | 0.4 | 0.4 | 0.4 | 0.4 | 0.4 | 0.4 | 0.4 | 0.4 |
| T (° C) | 80 | 80 | 80 | 80 | 80 | 80 | 80 | 80 | 80 |
| Filtration - Step | | | | | | | | | |
| T (° C) | 25–60 | 25–60 | 25–60 | 25–60 | 25–60 | 25–60 | 25–60 | 25–60 | 25–60 |
| Extraction of resin | | | | | | | | | |
| in a thin-layer evaporator | | | | | | | | | |
| T (° C) | 230 | 230 | 260 | 230 | 275 | 230 | 275 | 230 | 275 |
| P (millimeters of mercury) | 25 | 25 | 25 | 25 | 25 | 25 | 25 | 25 | 25 |

Contained in the Batches Described at (I)

The polymerization conditions for each batch permitting to selectively obtain resins with various softening points from the same batch are given hereunder at table II, whereas, the catalyst rate is expressed in parts of $BF_3$ by weight, for 100 parts, by weight, of fresh hydrocarbon batch involved in the method;

the recycling rate expresses the number of parts (by volume) of the re-cycled reaction medium for one part (by volume) of fresh hydrocarbon batch involved in the method;

the resin-concentration is that of the solution drawn from the reactor and is expressed in weight of resin (in grams) per 100 grams of solution;

KS(° C) is the softening point or softening temperature (expressed in ° C) and is determined by the Kraemer-Sarnow method (NFT 67-001 standard);

the Gardner colour of the resin as finally obtained is determined (D 1544-68 ASTM standard) from a solution of 50 grams of said resin in 50 grams of toluene;

Polymerization of batches E, F, G.

| | E | F | G |
|---|---|---|---|
| Temperature, in ° C | 95 | 30 | 50 |
| Catalyst rate (in %, by weight, with respect to the fresh batch) | 0.6 | 0.56 | 0.255 |
| Recycling rate | 270 | 140 | 270 |
| Average dwell-time, in minutes | 30 | 30 | 30 |
| Resin concentration, in % by weight | 38 | 57 | 24 |
| Viscosity of the resin obtained (at 25° C, in poises) | 4 | 375 | 6.5 |
| Gardner-colour (as determined from a 50% solution in toluene) | 12 | 1 | 1 |
| Neutralizing, washing, and filtering steps | see table II | see table II | see table II |
| Extraction of resin: | | | |
| temperature in ° C | 170–180 | 185 | 185 |
| pressure, in millimeters of mercury | 15–25 | 15–25 | 15–25 |

III. Incidence of the Recycling Rate

Batch used = batch A
Constant parameters = Temperature 45° C
  Average dwell time = 33 minutes
  % $BF_3$ = 0.2

Table III, given hereunder, indicates the results obtained according to the recycling-rate adopted.

TABLE III

| Recycling - rate | 120 | 95 | 80 | 30 |
|---|---|---|---|---|
| Concentration of resin in the drawn solution (in %) | 51 | 47.5 | 48.5 | 46 |
| KS | 76 | 87 | 90 | 94 |
| Δt (° C) * | ≈1 | 2 | 2 | 5 |

* Temperature at the reactor-inlet, minus temperature at the reactor-outlet.

IV. Incidence of Temperature

Batch used = batch A p1 Constant parameters =
  Recycling rate = 120
  Average dwell time = 33 minutes
  % $BF_3$ = 0.2

Table IV, given hereunder, indicates the results obtained according to the reaction-temperature.

TABLE IV

| Temperature in ° C | 30 | 45 |
|---|---|---|
| Concentration of resin (in %) | 49 | 51 |

TABLE IV-continued

| Temperature in ° C | 30 | 45 |
|---|---|---|
| KS (° C) | 88 | 76 |

V. Incidence of the Catalyst Rate

Batch used = batch A
Constant parameters = Temperature 45° C
   Recycling rate = 120
   Average dwell time = 33 minutes

|  | E' |  | B' |  |
|---|---|---|---|---|
| Conditions of treatment |  |  |  |  |
| Polymerisation temperature (in ° C) | 65 | Polymerisation temperature (in ° C) | 60 |
| Catalyst ratio (% by weight/batch) | 0.6 | Catalyst ratio (% by weight/batch) | 0.29 |
| Recycling rate | 270 | Recycling rate | 100 |
| Average dwell time (in minutes) | 30 | Average dwell time (in minutes) | 30 |
| Neutralisation - washing and filtration steps | See table II | Neutralisation - washing and filtration steps | See table II |
| Extraction of resin temperature (° C) | 170–180 | Extraction of resin temperature (° C) | 230 |
| Pressure (mmHg) | 15 | Pressure (mmHg) | 25 |

Results obtained

| | Without Water | With water | | | | Without Water | With water | |
|---|---|---|---|---|---|---|---|---|
| Molar Ratio ($H_2O$)/($BF_3$) | 0 | 0.7 | 1.5 | 2.2 | Molar Ratio ($H_2O$)/$BF_3$) | 0 | 0.7 | 1.5 |
| Concentration of resin (% with respect to the batch) | 39.9 | 39.6 | 38.6 | 19.7 | Concentration of resin (% with respect to the batch) | 49.9 | 49.5 | 49.4 |
| Aspect of resin | semi-solid | soft | soft | tough | KS (° C) | 95 | 82 | 78 |
| Viscosity in poises (60° C) | 5970 | 7.3 | 6.9 | >18000 | | | | |

Table V, given hereunder, indicates the results obtained by varying the catalyst rate.

TABLE V

| $BF_3$ (with respect to the fresh load) | 0.2 | 0.3 |
|---|---|---|
| Concentration of resin (in %) | 51 | 55 |
| KS (° C) | 76 | 67 |

VI. Incidence of the Average Dwell Time

Batch used = batch A
Constant parameters = Recycling rate = 120
   Temperature = 60° C
   % $BF_3$ = 0.2

Table VI, given hereunder, indicates the results obtained by causing the average dwell time to vary.

TABLE VI

| Average of the dwell time (in minutes) | 15 | 60 |
|---|---|---|
| Concentration of resin (in %) | 51 | 54 |
| KS (° C) | 89 | 70 |

VII. Incidence of Water Added

Water is added on the suction side of pump 5
Batches used

| | E' % (by weight) | | B' % (by weight) |
|---|---|---|---|
| Benzene | 0.6 | Ethylbenzene | 1.1 |
| Toluene | 4.1 | Xylenes | 7.1 |
| Ethylbenzene | 6.2 | Styrene | 5.1 |
| Xylenes | 40.5 | Ethyltoluenes | 4.8 |
| Styrene | 27.2 | α-methylstyrene | 0.9 |
| n-propylbenzene | 0.5 | Vinyltoluenes | 18.8 |
| Ethyltoluenes } Alkylbenzene | 4.8 | Pseudocumene | 4.2 |
| | | DCPD | 0.5 |
| Mesitylene | 1.4 | Indane | 0.5 |
| Pseudocumene | 2.4 | Indene | 13.9 |
| α-methylstyrene + DCPD | 0.9 | Methyl DCPD | 0.5 |
| β-methylstyrene | 0.7 | Methylindenes | 8.9 |
| Vinyltoluenes | 6.1 | Naphthalene | 7.2 |
| Indenes | 2.5 | Other batches | 26.5 |
| Other batches | 2.1 | | |

It can be observed, from the above results, that, other conditions being the same, the increase of the recycling-rate will lead to a lower softening point and induce a slight increase of the resin-concentration and a more regular reaction-temperature.

The temperature rise will induce a lower resin softening point. The catalyst rate and the average dwell time act in the same manner.

As for the amount of unsaturated compounds in the output stream, the applicant has observed that it varies very little with respect to the recycling ratio and that it slightly increases as the average dwell time decreases. It can therefore be considered that the polymerization reaction as carried out according to the invention is substantially achieved prior to the recycling of a portion of the reaction medium.

In addition, as regards the addition of water, it is quite surprisingly observed that, with respect to liquid resins, the incidence of such an addition on viscosity is important, and that viscosity favourably decreases when small amounts of water (0.7 and 1.5 ratios) are added, whereas the value of the viscosity is already considerably increased with respect to the value obtained without added water, as indicated by the corresponding results for a ratio of 2.2.

With respect to solid resins, the addition of water permits one to lower the softening point of the resins obtained.

We claim:
1. In the method for the continuous manufacture of hydrocarbon resins, starting from polymerizable unsaturated hydrocarbons, with controlling of the temperature of the polymerization reaction conducted in the presence as catalyst of a Lewis acid, and comprising the steps of:

forming a mixture of the catalyst and of the hydrocarbon fraction to be polymerized with a view to polymerize said mixture in a reactor, said mixture containing by weight from 0.05 to 0.8 part of catalyst for 100 parts of hydrocarbons; diluting and dispersing said mixture homogeneously by means of, and in, a portion of stream of medium issuing from the reactor in the proportion of from 60 to 300 parts by volume of said stream for one part by volume of the hydrocarbon fraction to be polymerized; said polymerization being carried out in the presence of water; and drawing off the remaining portion of the medium issuing from the reactor so as to isolate the resin obtained therefrom, the improvement wherein the starting feed comprises 20–70% of polymerizable hydrocarbons consisting essentially of aromatic hydrocarbons with at least one unsaturated acyclic lateral chain or an unsaturated cyclic chain and poly-unsaturated cyclic hydrocarbons, the catalyst comprises boron trifluoride, the amount of water added is up to 2.2 moles per mole of catalyst, and the temperature of the reaction medium is maintained constant between 30° and 120° C for a dwell time of from 10 to 60 minutes, whereby there is selectively obtained a wide range of clear resins having viscosities above 1 poise at 25° C and softening points (KS) of less than 150° C.

2. Improvement according to claim 1, wherein the catalyst, either in the liquid or the gaseous state, is injected, diluted and dispersed in a reactor feeding stream comprising the required amount of the hydrocarbon fraction to be polymerized to what has been added the corresponding amount of the diluting and dispersing stream issuing from the reactor, the latter stream being the so-called 'recycling stream'.

3. Improvement according to claim 1, wherein the catalyst is gaseous $BF_3$.

4. Improvement according to claim 1, wherein the starting feed comprises 30 to 55% by weight of said polymerizable hydrocarbons.

5. Improvement according to claim 1, wherein the hydrocarbons to be polymerized, having a boiling point in the 100°–210° C range, comprises hydrocarbons selected from the group consisting of styrene, methylstyrenes, vinyl-toluenes, indene, methyl-indenes, di-cyclopentadiene, methyl-dicyclopentadienes and mixtures thereof.

6. Improvement according to claim 1, wherein the hydrocarbons to be polymerized, having a boiling-point in the 150°–210° C range, contains no styrene whatever.

7. Improvement according to claim 1, wherein the hydrocarbons to be polymerized, having a boiling point in the 130°–200° C range, mainly comprises indene and coumarone.

8. Improvement according to claim 1, wherein the resin is isolated from the mixture issuing from the reactor by a treatment comprising the steps of neutralizing by means of an aqueous solution of a strong basis with a concentration of from 2 to 25% by weight, decanting, washing the new liquid organic phase obtained with water at a temperature of from 50° to 90° C, decanting and filtering, and evaporation-distilling the non-polymerizable and the non-polymerized hydrocarbons contained in the retained phase, then extracting the desired resin.

9. Improvement according to claim 1, wherein the temperature of the reaction medium is maintained constant between 40° and 110° C for dwell time of from 10 to 60 minutes.

* * * * *